US010951094B2

(12) United States Patent
Yoshinori et al.

(10) Patent No.: US 10,951,094 B2
(45) Date of Patent: Mar. 16, 2021

(54) ROTATING ELECTRIC MACHINE

(71) Applicant: Mitsubishi Electric Corporation, Tokyo (JP)

(72) Inventors: Manabu Yoshinori, Tokyo (JP); Shoya Mizokami, Tokyo (JP); Ryuji Kitamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 10 days.

(21) Appl. No.: 16/404,900

(22) Filed: May 7, 2019

(65) Prior Publication Data

US 2020/0161911 A1 May 21, 2020

(30) Foreign Application Priority Data

Nov. 16, 2018 (JP) .............................. JP2018-215380

(51) Int. Cl.
*H02K 9/19* (2006.01)
*H02K 9/16* (2006.01)
*H02K 9/12* (2006.01)
*H02K 1/20* (2006.01)

(52) U.S. Cl.
CPC .................. *H02K 9/19* (2013.01); *H02K 1/20* (2013.01); *H02K 9/12* (2013.01); *H02K 9/16* (2013.01)

(58) Field of Classification Search
CPC .. H02K 1/20; H02K 9/19; H02K 5/20; H02K 9/00; H02K 9/005; H02K 9/04; H02K 9/12; H02K 9/16; H02K 9/18; H02K 9/193; H02K 9/197
USPC .......................... 310/52, 54, 57, 58, 60 A, 64
See application file for complete search history.

(56) References Cited

U.S. PATENT DOCUMENTS

| 5,923,108 | A | 7/1999 | Matake et al. |
| 2016/0126799 | A1 | 5/2016 | Ohashi |
| 2017/0047809 | A1* | 2/2017 | Sawada .................... H02K 9/19 |
| 2017/0217301 | A1* | 8/2017 | Nagao .................... H02K 1/185 |
| 2018/0048207 | A1* | 2/2018 | Nishitani ............... H02K 15/14 |

FOREIGN PATENT DOCUMENTS

| JP | 10-052002 A | 2/1998 |
| JP | 2006-296005 A | 10/2006 |
| JP | 2015-208051 A | 11/2015 |
| JP | 2016-86611 A | 5/2016 |
| WO | 2016/174711 A1 | 11/2016 |

OTHER PUBLICATIONS

Reason for Rejection dated Nov. 12, 2019 issued by the Japanese Patent Office in counterpart application No. 2018-215380.

* cited by examiner

*Primary Examiner* — Quyen P Leung
*Assistant Examiner* — Alexander A Singh
(74) *Attorney, Agent, or Firm* — Sughrue Mion, PLLC; Richard C. Turner (57) ABSTRACT

Provided is a rotating electric machine that allows a stator cooling passage to be formed compactly. A passage of a stator cooling refrigerant is formed by a water jacket fitted and fixed to both ends on a base side which is the flange side and a distal end side of a cylindrical portion of a stator frame on an outer circumference of the cylindrical portion, the stator frame has a difference between a diameter on the base side and a diameter on the distal end side, the diameter on the base side being formed to be larger, and the stator frame and the water jacket are sealed by press fitting and welding on the base side and the distal end side.

18 Claims, 8 Drawing Sheets

ROTATING ELECTRIC MACHINE

BACKGROUND OF THE INVENTION

1. Field of the Invention

The present disclosure relates to a rotating electric machine.

2. Description of the Background Art

As a conventional rotating electric machine, for example, the one described in Patent Document 1 has a structure in which a stepped water jacket (outer tube member) is retained by the outer circumference of a stepped stator frame (inner tube member) whose flange portion is fixed to a housing, thereby forming a stator cooling passage and thus retaining a stator core.

As another example, the rotating electric machine described in Patent Document 2 has a structure in which a stepped water jacket (outer tube member) is retained by the outer circumference and the end surface in the axial direction (coil-end upper portion) of a stator frame (inner tube member) that does not have a stepped outer diameter, thereby forming a stator cooling passage and thus retaining a stator core.

Patent Document 1: Japanese Laid-Open Patent Publication No. 2015-208051

Patent Document 2: Japanese Laid-Open Patent Publication No. 10-52002

However, in order to form the stator refrigerant passage, a step is provided on the flange base side of the frame in Patent Document 1, so that the size of the outer diameter is increased. Also, in Patent Document 2, a seal needs to be provided on the end surface in the axial direction, so that the size in the axial direction is increased, resulting in deterioration in the ease of layout.

SUMMARY OF THE INVENTION

The present disclosure has been made to solve the above-described problem and an object of the present disclosure is to provide a rotating electric machine that allows a stator cooling passage to be formed compactly.

A rotating electric machine according to one aspect of the present disclosure includes: a stator core formed in an annular shape; a stator frame having a flange and having a straight shape on the inner diameter side, the stator frame being retained by fitting to an outer circumferential surface of the stator core with a predetermined interference; and a water jacket fitted and fixed to both ends on a base side which is the flange side and a distal end side of a cylindrical portion of the stator frame on an outer circumference of the cylindrical portion. A passage of a stator cooling refrigerant is formed by the stator frame and the water jacket. The stator frame has a difference between a diameter on the base side and a diameter on the distal end side, the diameter on the base side being formed to be larger. The stator frame and the water jacket are sealed by press fitting and welding on the base side and the distal end side of the stator frame.

The rotating electric machine according to one aspect of the present disclosure allows the stator cooling passage to be formed compactly in both the radial direction and the axial direction. Accordingly, the ease of layout in a vehicle can be improved. In addition, the motor weight can be reduced.

DETAILED DESCRIPTION OF THE PREFERRED EMBODIMENTS OF THE INVENTION

Hereinafter, a preferred embodiment of the cooling structure of a rotating electric machine according to the present disclosure will be described with reference to the drawings. Identical or equivalent portions are denoted by identical reference numerals, and the detailed description thereof is omitted. Similarly, also in the subsequent embodiments, redundant description of the components denoted by identical reference numerals is omitted.

First Embodiment

Figure 1:
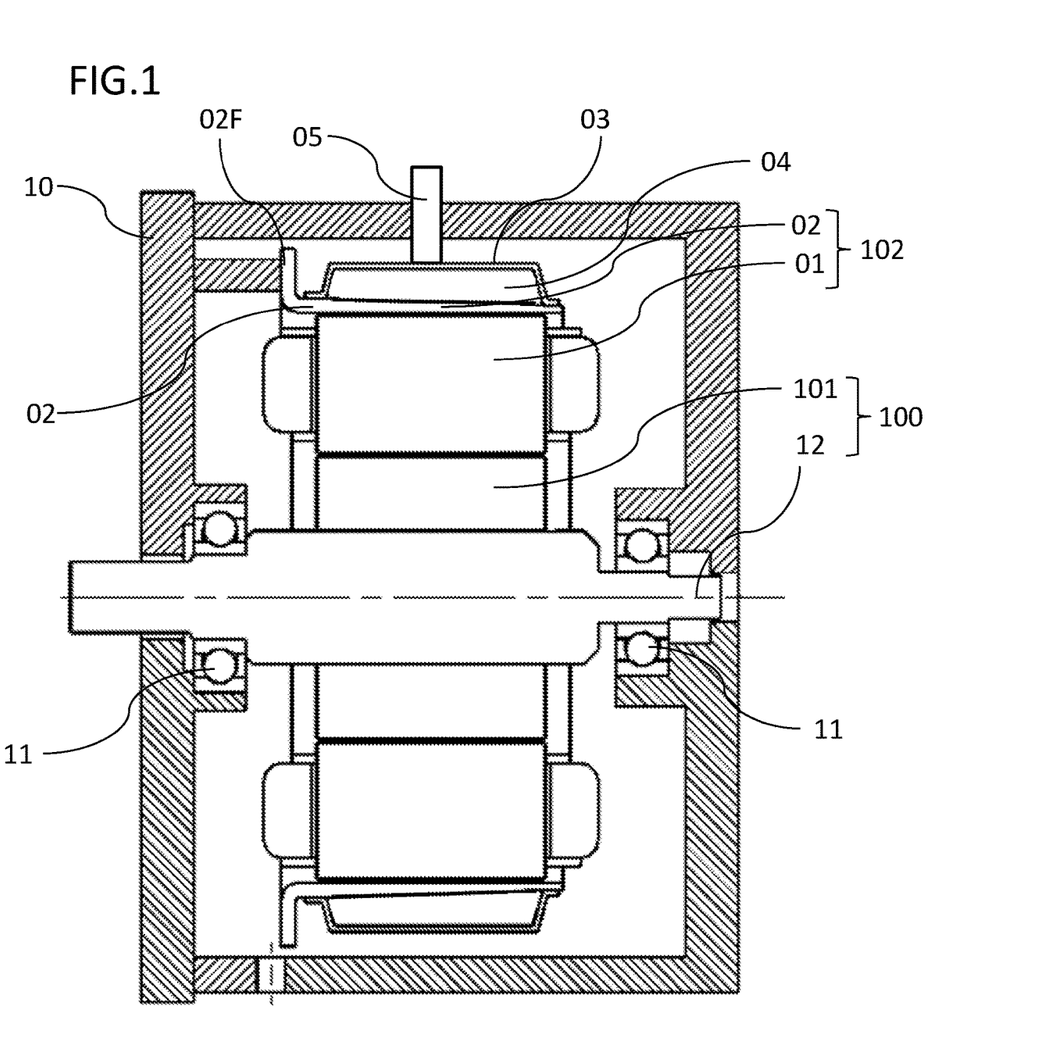
FIG. 1 is a cross-sectional view of a rotating electric machine according to the first embodiment.
Figure 2:
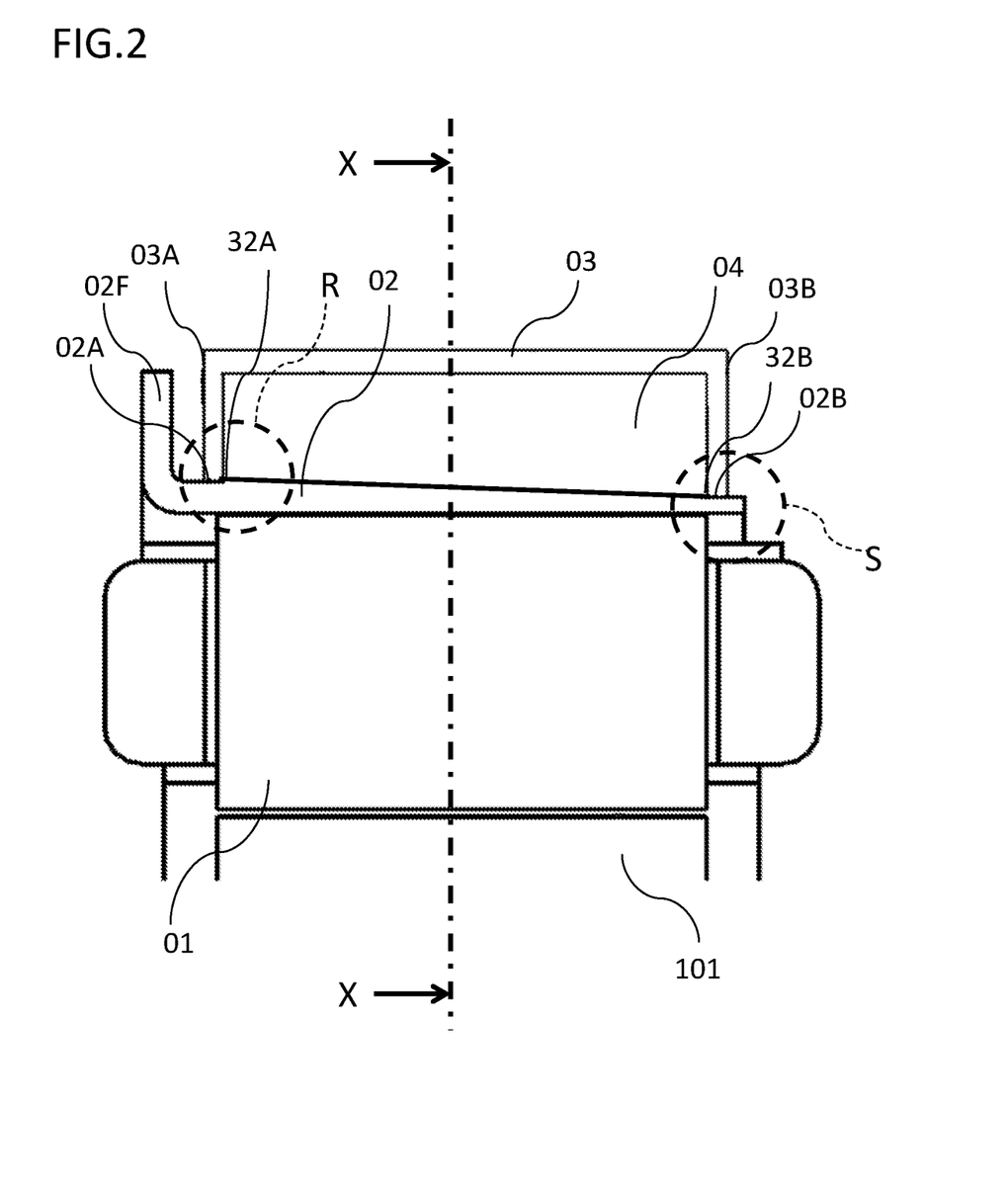
FIG. 2 is a cross-sectional view of a stator according to the first embodiment.

FIG. 1 is a cross-sectional view of a rotating electric machine according to the first embodiment, and FIG. 2 is a cross-sectional view of a stator. In FIG. 1, a rotor 100 rotatably mounted to a housing 10 through a bearing includes a shaft 12 and a rotor core 101 fixed to the shaft 12. A plurality of magnets (not shown) are embedded in the rotor core 101.

A stator 102 located on the outer circumferential side of the rotor core 101 and fixed to the housing 10 through a plurality of bolts (not shown) is composed of a stator core 01 formed in an annular shape and a cylindrical stator frame 02 for fitting and retaining the outer circumferential surface of the stator core 01 with a predetermined interference, and the stator 102 is fixed to the housing 10 with a flange portion 02F of the stator frame 02. The stator frame 02 is produced by press molding. As shown in FIG. 2, the inner diameter side of the stator frame 02 is formed in a straight shape, and the outer circumference thereof has such a shape that the diameter decreases toward a distal end side 02B from a base side 02A, and is formed such that there is a diameter difference between the base side 02A and the distal end side 02B.

Figure 3:
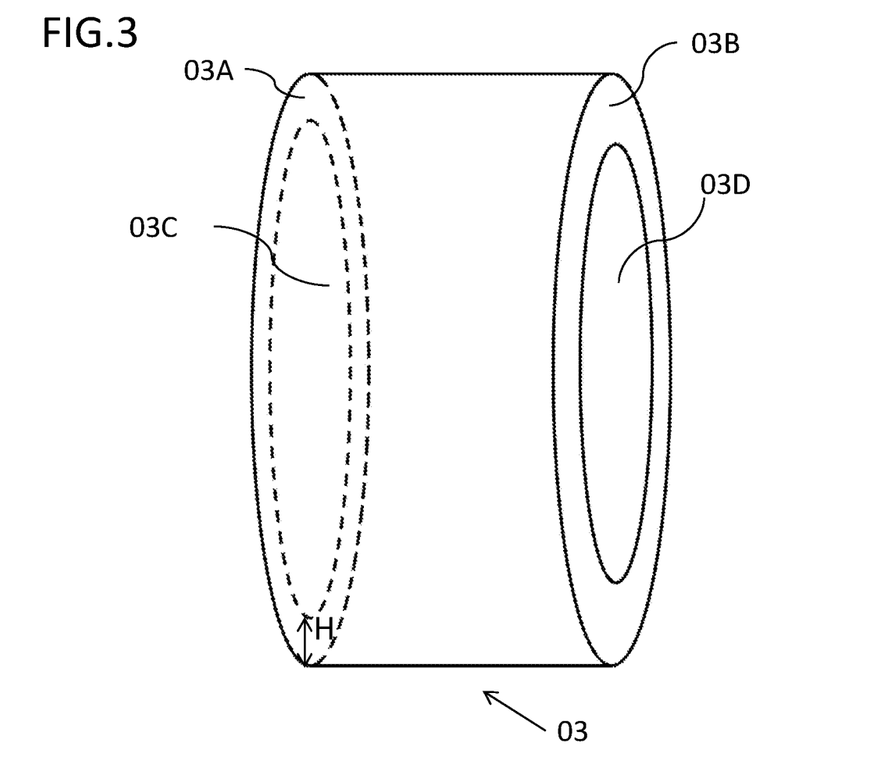
FIG. 3 is a perspective view of a water jacket according to the first embodiment.

As shown in FIG. 3, a water jacket 03 is formed in an annular shape, and is formed to have a U-shaped cross section such that the water jacket 03 has bottom surfaces 03A and 03B from edges of both bottom portions and hole portions 03C and 03D are formed at the central portion. The diameters of the hole portions 03C and 03D have substantially the same difference as the diameter difference between the base side 02A and the distal end side 02B of the stator frame 02. The outer circumference of the stator frame 02 is inserted into the hole portions 03C and 03D, and the stator frame 02 and the water jacket 03 are press-fitted on the base side 02A and the distal end side 02B, thereby being fitted and fixed.

Thus, a stator cooling passage 04 through which a stator cooling refrigerant passes is formed in the space between the outer circumference of the stator frame 02 and the inner circumference of the water jacket 03. The cooling passage is sealed by welding at fitted fixed portions 32A and 32B between the stator frame 02 and the water jacket 03.

With such a configuration, the stator refrigerant passage can be formed compactly in both the radial direction and the axial direction. Accordingly, the ease of layout in a vehicle can be improved.

Since it is not necessary to form a step for forming a passage on the base side 02A of the stator frame 02, the stator frame 02 can be formed so as to have a small thickness and reduce the outer diameter, thus making it possible to achieve weight reduction.

Furthermore, since it is not necessary to form a sealing portion between the stator frame 02 and the water jacket 03 at a coil-end upper portion on the end surface in the axial direction of the rotor (or the longitudinal direction of the shaft 12; hereinafter referred to as "axial direction"), it is possible to achieve weight reduction.

As described above, since the stator cooling passage 04 is sealed by press fitting and welding on the base side 02A and the distal end side 02B of the stator frame 02, it is possible to achieve cost reduction and improved reliability as compared with an O-ring seal or the like.

Furthermore, the inner diameter step of the stator frame 02 can be eliminated, and it is therefore possible to increase the fitting length in the axial direction with the stator core 01. Accordingly, the stator core can be retained with a small fitting interference, and it is therefore possible to prevent, for example, galling during press fitting, thus making it possible to improve the ease of assembly during fitting.

In press molding of the stator frame 02, the thickness of the stator frame 02 can be gradually decreased from the base side 02A of the flange portion 02F to the distal end side 02B of the cylindrical portion, and the base side 02A and the distal end side 02B, which will become press-fitted and welded sealing portions, can be molded into fixing portions for the water jacket 03 by only performing cutting-free pressing with a small diameter difference, thus making it possible to achieve improved production performance and a reduced production cost for the stator frame.

Figure 4:
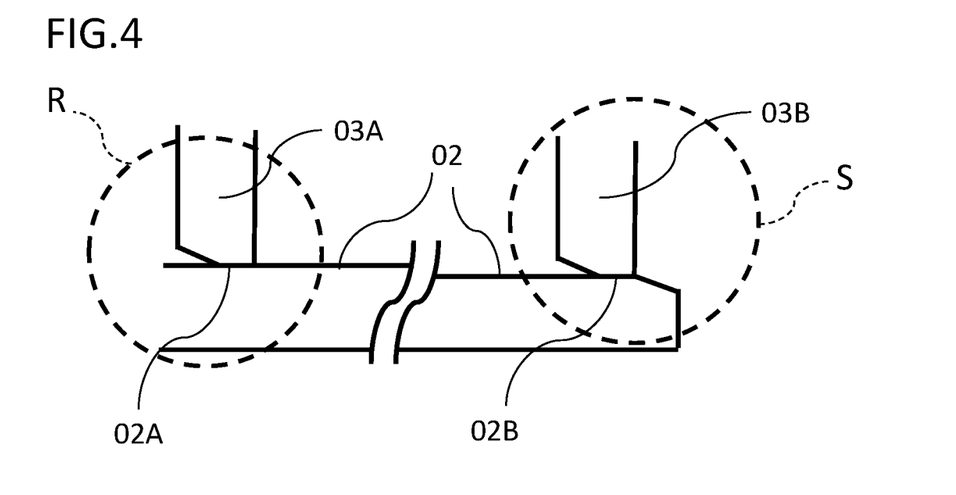
FIG. 4 is an enlarged view of circle part R and circle part S that are indicated by the broken lines in FIG. 2.

FIG. 4 shows an enlarged view of circle part R and circle part S that are indicated by the broken lines in FIG. 2. A side end portion of the cylindrical portion of the stator frame 02 and a larger-outer-diameter-side end portion of the water jacket 03 have a tapered shape formed by press sagging, and thus can function as guide portions for press fitting. This eliminates the need for cutting/chamfering, making it possible to reduce the production cost. One or both of the side end portion of the cylindrical portion of the stator frame 02 and the larger-outer-diameter-side end portion of the water jacket 03 have the tapered shape. As described above, as shown in FIG. 2, the outer circumference of the stator frame 02 is formed to have a diameter difference between the base side 02A and the distal end side 02B, there is a gradual slope between the base side 02A and the distal end side 02B, and this sloped portion also functions as a guide portion for press fitting on the flange portion 02F side.

Figure 5:
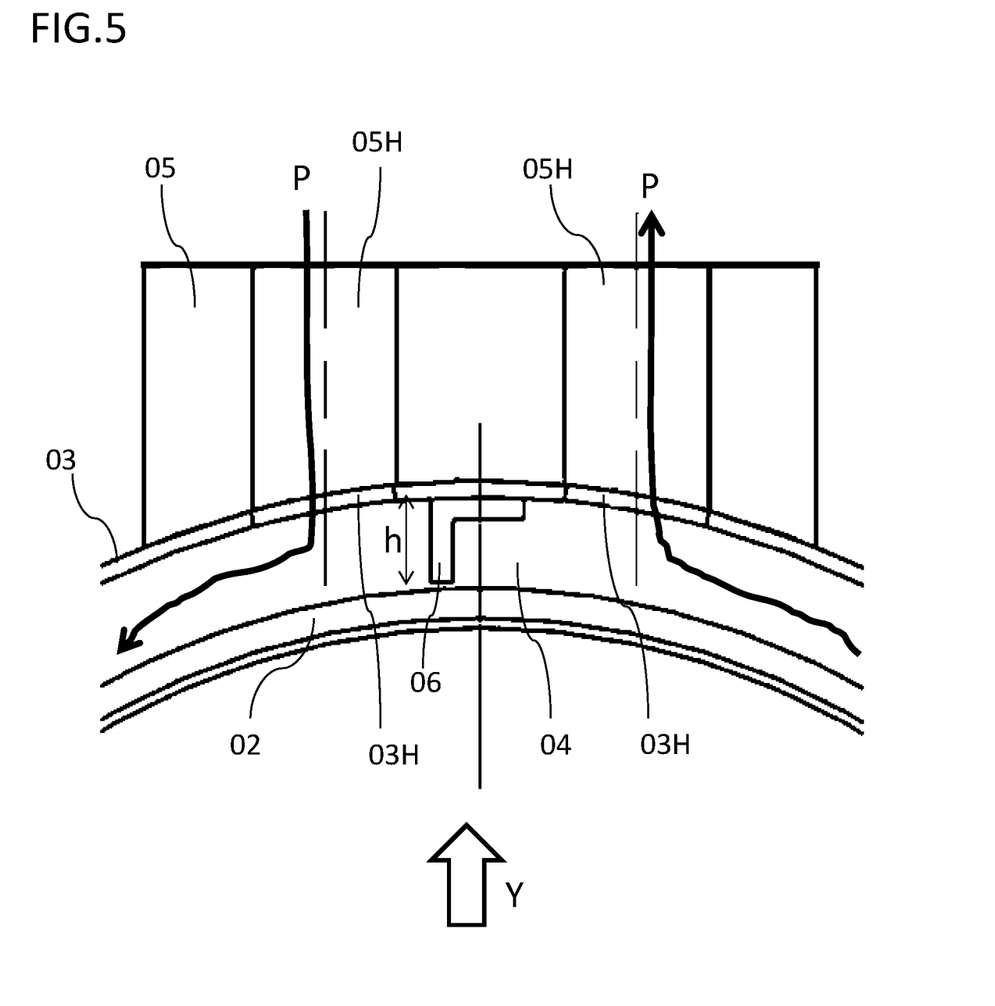
FIG. 5 is a diagram showing a part of a cross-sectional view taken along a line X-X in FIG. 2.

FIG. 5 shows a part of a cross-sectional view of the stator cooling passage 04 as viewed in the X-direction shown in FIG. 2. Although not shown in FIG. 2, in the water jacket 03 that forms the stator cooling passage 04, two openings 03H serving as a flow inlet and a flow outlet of the stator cooling refrigerant are provided adjacent to each other in the circumferential direction. As also shown in FIG. 1, a stay 05 for connecting a cooling pipe supplied from a vehicle is assembled to the outer circumference of the water jacket 03. In the stay 05, openings 05H are provided in communication with the openings 03H of the water jacket 03, thus forming the inlet and the outlet of the stator cooling passage 04. On the water jacket 03 side of the stator cooling passage 04, a stopper 06 is mounted at the center between the two openings 03H, and the stator cooling refrigerant that has flowed in cools the entire stator. Thus, short circuit and backflow between the inlet and the outlet can be prevented by the stopper 06, and the stator cooling refrigerant is adjusted so as to flow in a ring form through the passage as indicated by arrows P.

By forming the height h of the stopper 06 to be smaller than the radial length H of the bottom surface 03A of the water jacket 03 shown in FIG. 3, the stopper 06 can be fitted in a U-shaped recessed portion of the water jacket 03. Accordingly, the stopper 06 can be configured so as not to impede press fitting of the stator frame 02.

Figure 6A:
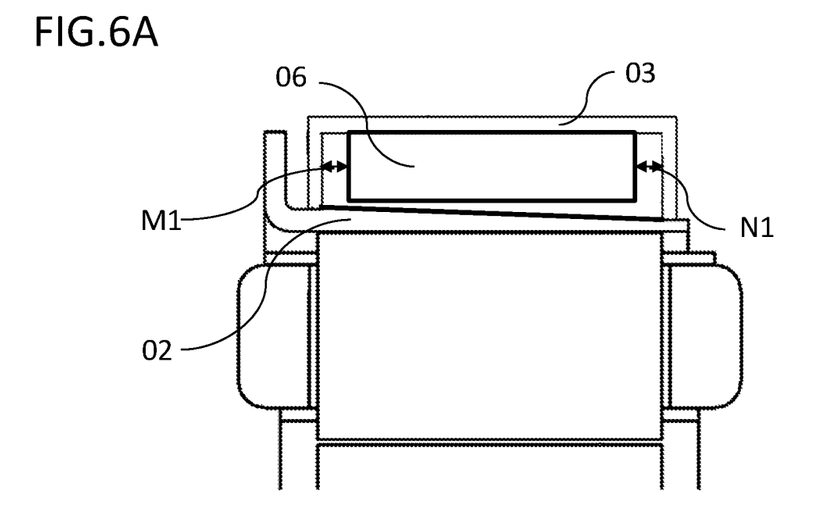
FIG. 6A is a diagram illustrating the mounting of the water jacket.
Figure 6B:
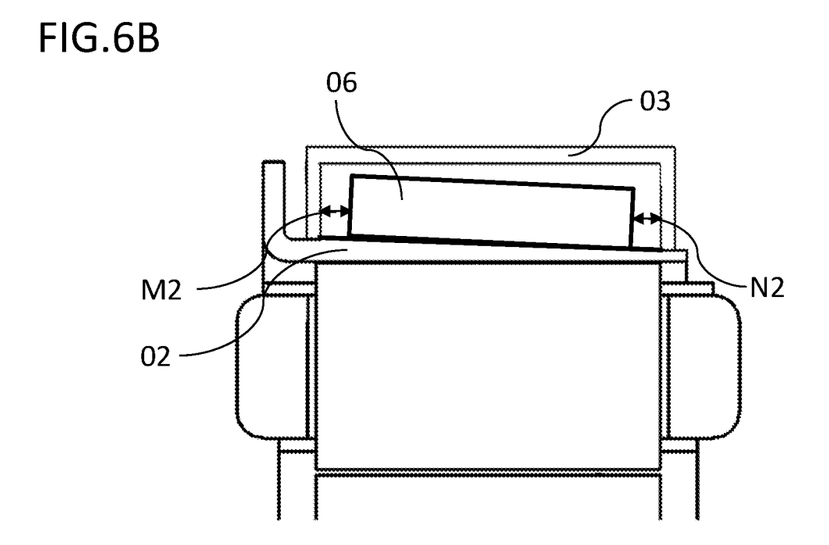
FIG. 6B is a diagram illustrating the mounting of the water jacket.

As shown in FIG. 6A, in the case of mounting the stopper 06 to the water jacket 03, gaps M1 and N1 on both sides in the axial direction between the stopper 06 and the water jacket 03 are determined by the stopper 06 and the water jacket 03. In contrast, in the case of mounting the stopper 06 to the stator frame 02 as shown in FIG. 6B, for the gaps M2 and N2 on both sides in the axial direction between the stopper 06 and the water jacket 03, it is necessary to take into consideration the assembly variations among three components, i.e., the stopper 06, the water jacket 03, and the stator frame 02. Therefore, by mounting the stopper 06 to the water jacket 03, the assembly variations can be made smaller, and the leakage of the refrigerant from the gaps can be reduced. Accordingly, the cooling efficiency can be improved. Furthermore, it is possible to eliminate the variations in press-fitting stroke between the stator frame 02 and the water jacket 03.

As shown in FIG. 5, the stopper 06 can be produced in the form of a simple L-shaped sheet metal, and one side of the L-shape is fixed to the inner circumference of the water jacket 03. With such a shape of the stopper, it is possible to achieve cost reduction.

Figure 7:
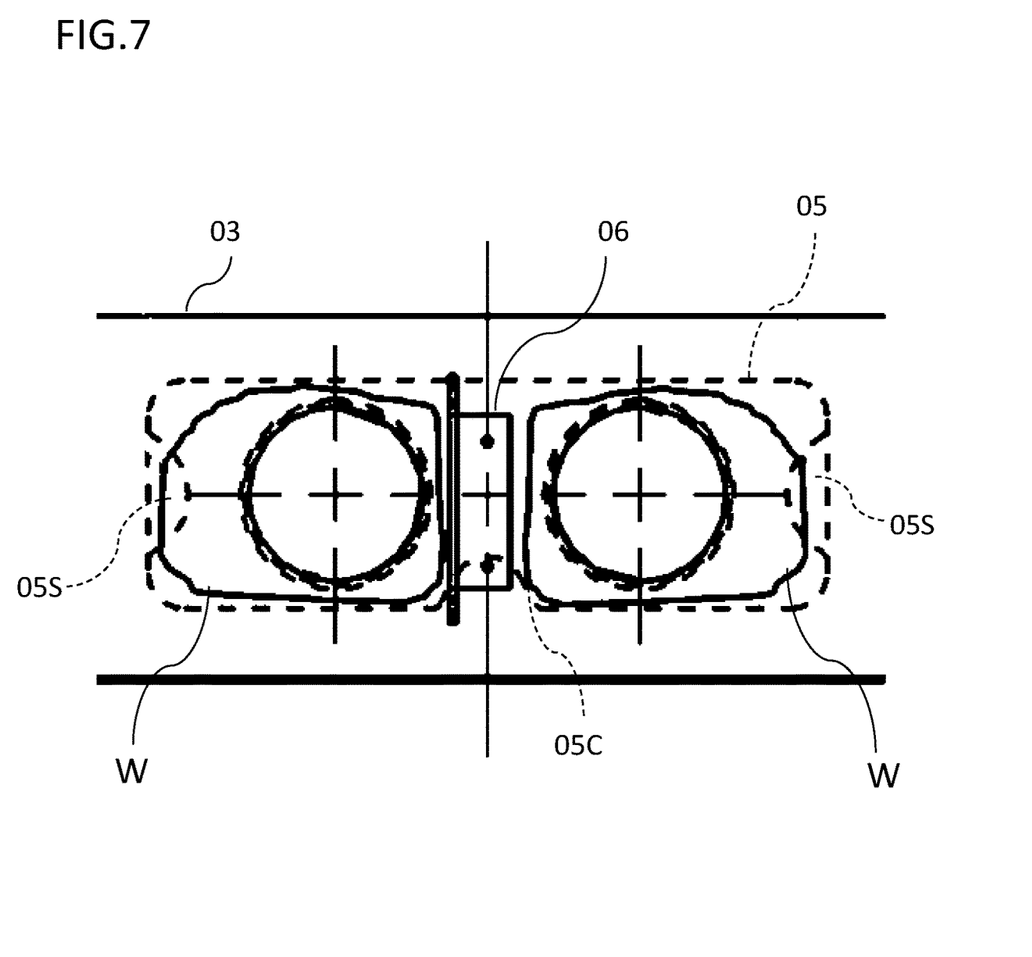
FIG. 7 is a diagram showing the mounting form of a stopper as viewed in the Y-direction in FIG. 5.

FIG. 7 is a diagram showing the mounting form of the stopper 06 according to the first embodiment, when the water jacket 03 is viewed in the Y-direction shown in FIG. 5. The stopper 06 and the water jacket 03 are fixed by welding, and the stay 05 has a cut-out portion 05C. In addition, the stay 05 is provided with a thinned portion 05S on a welding trajectory W. Accordingly, the state of welding/mounting between the stay 05 and the stopper 06 can be visually checked at a welding penetration portion, and therefore, the welding condition can be easily determined.

Second Embodiment

Figure 8:
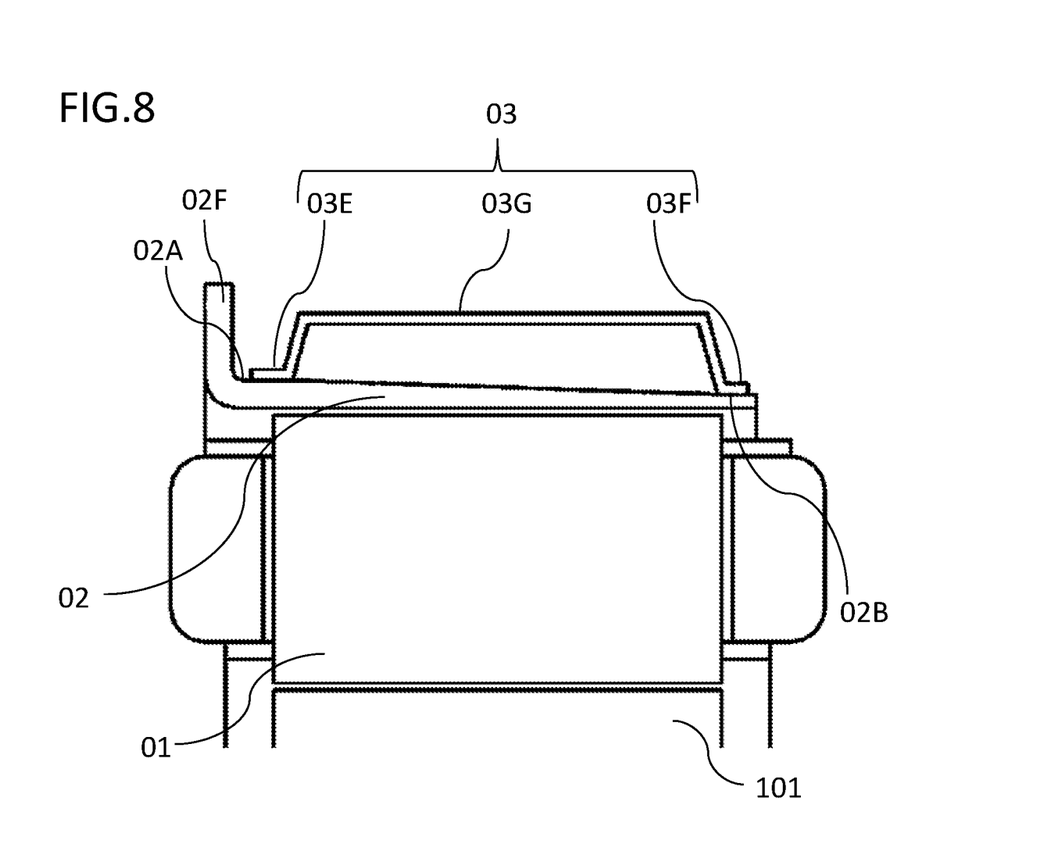
FIG. 8 is a cross-sectional view of a stator according to the second embodiment.

FIG. 8 is a cross-sectional view of a stator showing the cooling structure of a rotating electric machine according to the second embodiment. In FIG. 8, a water jacket 03 has a stepped U-shape in which the ends on both sides are bent so as to form outward stepped portions 03E and 03F. The outward stepped portion 03E and stepped portion 03F are fitted to the outer circumference of a stator frame 02 along the diameter difference from a base side 02A to a distal end side 02B of the outer circumference of the stator frame 02. Therefore, the stepped portion 03E and the stepped portion 03F are different in height from a side portion 03G.

With such a configuration, it is possible to ensure a large sealing length for press fitting and welding with the stator frame 02. Accordingly, the sealing reliability can be improved.

Figure 9:
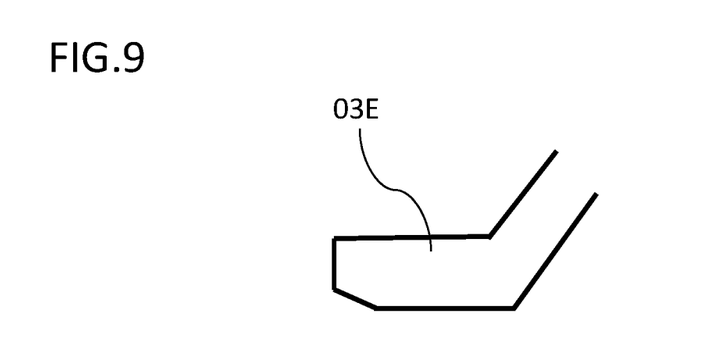
FIG. 9 is an enlarged view of a larger-outer-diameter-side end portion of a stepped portion of a water jacket according to the second embodiment.

As in the description in the first embodiment, a larger-outer-diameter-side end portion of the stepped portion 03E of the water jacket 03 has a tapered shape formed by press sagging, for example, as shown in FIG. 9, and thus can function as a guide portion for press fitting. This eliminates the need for cutting/chamfering, making it possible to reduce the production cost.

Figure 10A:
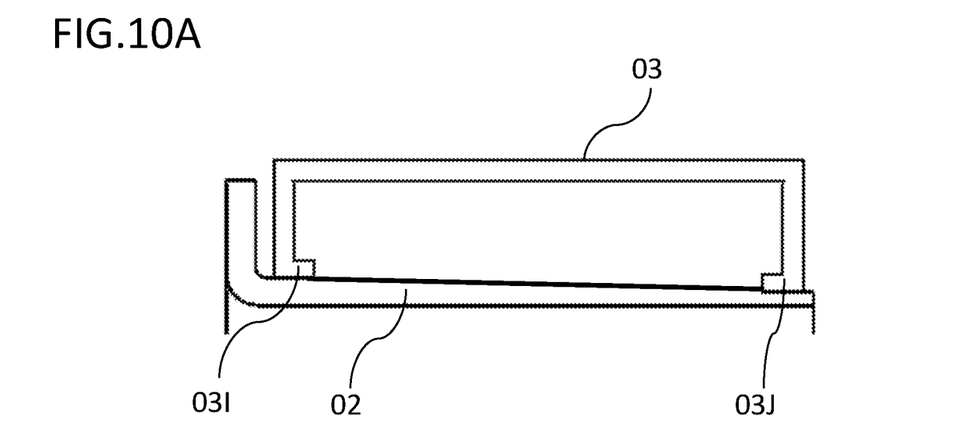
FIG. 10A is a cross-sectional view showing the shape of another water jacket according to the second embodiment.
Figure 10B:
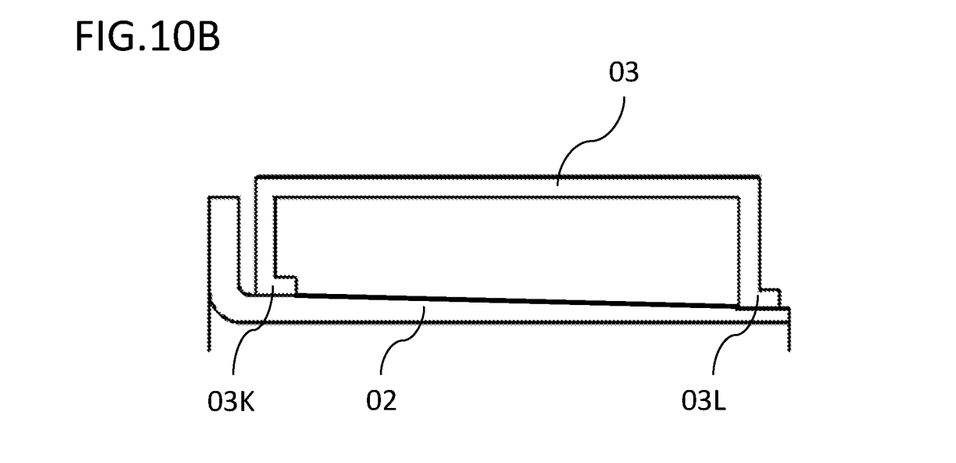
FIG. 10B is a cross-sectional view showing the shape of another water jacket according to the second embodiment.

Although the stepped portions 03E and 03F form outward stepped portions at the ends on both sides in FIG. 8, the ends on both sides may form inward stepped portions 03I and 03J as shown in FIG. 10A. Alternatively, one of the ends on both sides may form an inward stepped portion 03K, and the other may form an outward stepped portion 03L as shown in FIG. 10B.

With any of such configurations as well, the press fitting of the stator frame 02 can be performed smoothly. Furthermore, it is possible to ensure a large sealing length for welding because the peripheries of the stepped portions 03I, 03J, 03K, and 03L are welded to the stator frame 02. Accordingly, the sealing reliability can be improved.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, along or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 01 stator core
02 stator frame
03 water jacket
04 stator cooling passage
05 stay
06 stopper

What is claimed is:

1. A rotating electric machine comprising:
a stator core formed in an annular shape;
a stator frame having a flange and having a straight shape on an inner diameter side, the stator frame being retained by fitting to an outer circumferential surface of the stator core with a predetermined interference; and
a water jacket fitted and fixed to both ends, on a base side where the flange is located and a distal end side of a cylindrical portion of the stator frame on an outer circumference of the cylindrical portion, wherein
a passage of a stator cooling refrigerant is formed by the stator frame and the water jacket,
the stator frame has a difference between diameter on the base side and a diameter on the distal end side, the diameter on the base side being formed to be larger, and
the stator frame and the water jacket are sealed by press fitting and welding on the base side and the distal end side of the stator frame,
wherein the water jacket comprises a base side wall and a distal end side wall extending in a radial direction, and
wherein:
a thickness of the base side wall in an axial direction increases with increasing distance from an axial center of the water jacket; or
a thickness of the distal end side wall in the axial direction increases with increasing distance from the axial center of the water jacket; or
a slope with respect to the axial direction of an outer diameter side of the stator frame on the distal end side is greater than a slope of the outer diameter side of the stator frame on the base side.

2. The rotating electric machine according to claim 1, wherein
the water jacket has a stepped U-shaped cross section.

3. The rotating electric machine according to claim 2, wherein
one or both of an end portion of the cylindrical portion of the stator frame and a larger-outer-diameter-side end portion of the water jacket have a tapered shape.

4. The rotating electric machine according to claim 3, wherein
a stopper for dividing a flow of the stator cooling refrigerant is fixed to an inner circumference of the water jacket.

5. The rotating electric machine according to claim 4, wherein
the stopper has an L-shape, and one side of the L-shape is fixed to the inner circumference of the water jacket.

6. The rotating electric machine according to claim 2, wherein
a stopper for dividing a flow of the stator cooling refrigerant is fixed to an inner circumference of the water jacket.

7. The rotating electric machine according to claim 6, wherein
the stopper has an L-shape, and one side of the L-shape is fixed to the inner circumference of the water jacket.

8. The rotating electric machine according to claim 2, further comprising
a stay welded to an outer circumference of the water jacket and serving for connecting a cooling pipe, wherein
the stay has a thin cut-out portion on a welding trajectory.

9. The rotating electric machine according to claim 1, wherein
one or both of an end portion of the cylindrical portion of the stator frame and a larger-outer-diameter-side end portion of the water jacket have a tapered shape.

10. The rotating electric machine according to claim 9, wherein
a stopper for dividing a flow of the stator cooling refrigerant is fixed to an inner circumference of the water jacket.

11. The rotating electric machine according to claim 10, wherein
the stopper has an L-shape, and one side of the L-shape is fixed to the inner circumference of the water jacket.

12. The rotating electric machine according to claim 11, further comprising
a stay welded to an outer circumference of the water jacket and serving for connecting a cooling pipe, wherein
the stay has a thin cut-out portion on a welding trajectory.

13. The rotating electric machine according to claim 9, further comprising
a stay welded to an outer circumference of the water jacket and serving for connecting a cooling pipe, wherein
the stay has a thin cut-out portion on a welding trajectory.

14. The rotating electric machine according to claim 1, wherein
a stopper for dividing a flow of the stator cooling refrigerant is fixed to an inner circumference of the water jacket.

15. The rotating electric machine according to claim 14, wherein
the stopper has an L-shape, and one side of the L-shape is fixed to the inner circumference of the water jacket.

16. The rotating electric machine according to claim 15, further comprising
a stay welded to an outer circumference of the water jacket and serving for connecting a cooling pipe, wherein
the stay has a thin cut-out portion on a welding trajectory.

17. The rotating electric machine according to claim 14, further comprising
a stay welded to an outer circumference of the water jacket and serving for connecting a cooling pipe, wherein
the stay has a thin cut-out portion on a welding trajectory.

18. The rotating electric machine according to claim 1, further comprising
a stay welded to an outer circumference of the water jacket and serving for connecting a cooling pipe, wherein
the stay has a thin cut-out portion on a welding trajectory.

\* \* \* \* \*